United States Patent [19]

Gold

[11] Patent Number: 5,269,352
[45] Date of Patent: Dec. 14, 1993

[54] APPARATUS AND METHOD FOR REMOVING CONTENTS FROM COMPRESSED GAS CYLINDER

[76] Inventor: Jeffrey W. Gold, 1081 Los Angeles Ave., Atlanta, Ga. 30306

[21] Appl. No.: 624,333

[22] Filed: Dec. 7, 1990

[51] Int. Cl.$^5$ .......................... B65B 31/00; B67B 7/24
[52] U.S. Cl. ........................................ 141/51; 141/65; 141/97; 141/98; 29/403.1; 29/801; 222/80; 222/83.5; 222/87; 81/3.2; 100/902
[58] Field of Search ............... 141/66, 7, 51, 65, 93, 141/97, 98, 1; 29/403.1, 302.3, 426.1, 426.3, 426.4, 426.5, 801; 222/80, 81, 87, 83.5; 81/3.2, 309; 100/902

[56] References Cited

U.S. PATENT DOCUMENTS

| | | | |
|---|---|---|---|
| 3,333,735 | 8/1967 | Odasso | 222/83.5 X |
| 3,662,791 | 5/1972 | Ruscitti | 141/65 |
| 3,993,221 | 11/1976 | Boynton et al. | 222/87 X |
| 4,166,481 | 9/1979 | Farris et al. | 141/1 |
| 4,349,054 | 9/1982 | Chipman et al. | 141/1 |
| 4,407,341 | 10/1983 | Feldt et al. | 141/97 |
| 4,452,377 | 6/1984 | Hurley et al. | 141/7 X |
| 4,459,906 | 7/1984 | Cound | 222/87 X |
| 4,500,015 | 2/1985 | Penney | 222/83.5 |
| 4,580,700 | 4/1986 | Rush | 222/83.5 |
| 4,690,180 | 9/1987 | Gold | 141/51 |
| 4,944,333 | 7/1990 | Gold et al. | 141/51 |
| 4,966,317 | 10/1990 | Barr | 222/83.5 |
| 5,163,983 | 11/1992 | Eckman | 141/1 |

FOREIGN PATENT DOCUMENTS 1607991  10/1970  Fed. Rep. of Germany ........ 141/65

Primary Examiner—Ernest G. Cusick
Attorney, Agent, or Firm—Jones & Askew

[57] ABSTRACT

The present invention comprises an apparatus and method for removing and otherwise managing the contents of compressed gas cylinders and other hazardous containers. The invention includes a selectively sealable chamber that receives a container to be serviced. A shearing device such as a saw or cutter is provided within the chamber. Once the chamber is sealed, the shearing device engages the cylinder and shears off a portion thereof. Such an operation permits the entire contents of the cylinder to be released into the chamber. A preferred embodiment of the present invention includes a device for manipulating the position of the chamber to facilitate gravitational drainage of the contents. The present invention further includes a decontamination system that delivers decontamination or cleansing fluids to both the interior of the opened cylinder and the chamber. The present invention further includes an evacuation system that removes all gases from the chamber and the cylinder in a environmentally safe manner. All of these operations may be conducted remotely.

2 Claims, 5 Drawing Sheets

APPARATUS AND METHOD FOR REMOVING CONTENTS FROM COMPRESSED GAS CYLINDER

TECHNICAL FIELD

The present invention relates generally to hazardous waste disposal. More particularly, the present invention relates to the handling of cylinders containing compressed gases and liquids, and to the sampling and recontainerization of the contents of compressed gas cylinders.

BACKGROUND ART

Various materials, both hazardous and nonhazardous, are stored in compressed gas and liquefied cylinders. Such materials may be liquid, gaseous or solid in form. The containment and transfer of hazardous material is of concern. Chlorine gas is but one example of a hazardous material. Exposure to chlorine gas can result in severe lung irritation and death. Cylinders containing chlorine and other hazardous materials are therefore clearly marked and preferably kept in the best possible condition. Each year, however, numerous compressed gas and liquefied cylinders in damaged, deteriorated or unmarked condition are discovered at industrial plants, research facilities, and hazardous waste sites. These cylinders contain unknown, oftentimes dangerous, materials. To facilitate sampling and identification of unknown gases, liquids and solids, and to allow safe recontainerization and disposal of these dangerous materials, the cylinder must be depressurized, the contained material removed from the cylinder for evaluation and then transferred to intact, stable containers. Once the material is identified and contained in an intact, marked cylinder, the material can be shipped for disposal or otherwise. Some cylinders may contain material that exists in a liquid phase and upon depressurization of the cylinder, may not volatize into a gaseous state. Therefore, transfer of liquid material from the original cylinder to the intact container may be required. In fact, transfer of the original cylinder contents to the intact cylinders typically involves transferring both gases and liquids, and oftentimes the transfer of solid matter.

Great care must be taken when depressurizing a cylinder to prevent potentially hazardous gases and liquids from escaping to the environment. In addition, releasing the compressed gas must be carefully conducted to prevent the cylinder from sudden, missle-like propulsion. Such problems have been addressed in U.S. Pat. Nos. 4,690,180 (hereinafter the "'180 patent") and 4,944,333 (hereinafter the "'333 patent").

The '180 and '333 patents disclose techniques for the removal and disposal of contents from compressed gas cylinders whereby the cylinder is punctured at and along its mid-section. The cylinder is first horizontally positioned on V-shaped supports within an evacuated enclosure. Inert gases are introduced into the enclosure and the cylinder is both restrained and punctured by a punch-press type or drill assembly. This results in a hole or holes being formed along the mid-section of the cylinder to provide a path through which gases and liquids may drain from the cylinder into the enclosure. Hydraulic actuators are provided on the enclosure to allow manipulation or rocking of the enclosure to aid in drainage of the contents from the cylinder. The drained fluids and gases are then forced (by pressurization of the enclosure) or pumped from the enclosure for sampling and transfer to intact cylinders for shipping.

While suitable in many respects, these techniques have certain inherent disadvantages. One disadvantage is that puncturing the cylinder poses a sparking or explosion hazard when practiced on cylinders containing unstable, flammable gases. The action of the punch-press type assembly can cause a spark and a resulting explosion. An explosion may not only compromise the integrity of the enclosure but can cause damage to the internal mechanical parts. Of course, an explosion of sufficient strength could injure an operator. Another disadvantage is that no provision is made to decontaminate the interior of the enclosure or the interior of the cylinder. Once the gases have been discharged, the cylinder may remain contaminated by residual waste in the form of liquids or radioactive particles or otherwise. Incomplete decontamination of the cylinder can lead to a release of hazardous waste into the environment. Another disadvantage is that the cylinder is usually secured along only one axis. As such, the cylinder is susceptible to sudden release or propulsion upon decompression of the cylinder. Even when only a small hole is made in the side of the cylinder, the rapid escape of the compressed gas can cause the cylinder to spin or otherwise move. Yet another disadvantage of the devices shown in the '180 and '333 patents is that drainage of the fluid in cylinder may be inefficient or incomplete because the cylinder is positioned substantially horizontally and dependent upon rocking of the enclosure for drainage. It should be noted that rocking of the enclosure requires repetitive manipulation thereof. Even so, it is practically impossible to drain the cylinder completely since fluid can only exit the cylinder through a small hole at the location of the puncture.

It should be further noted that the art has yet to provide any back-up system whereby the cylinder may be emptied even though the primary system has failed. For example, should the puncturing mechanism prove ineffective or partially ineffective for any reason, no secondary system has been provided whereby decompressurization can be effected or completed. It is dangerous to open the enclosure and handle the cylinder when the decompressurization operation is only partially complete. Further, it is difficult to perform maintenance on the internal components when they are contaminated since persons performing such maintenance must wear protective clothing that decreases maneuverability and dexterity.

Thus, there is a need in the art for an improved method and apparatus for removing the contents of compressed gas and liquid cylinders.

SUMMARY OF THE INVENTION

The present invention fills the above described need in the prior art by providing an improved method and apparatus for removing the contents from compressed gas and liquid cylinders. The present invention reduces the risk of explosion typically associated with mechanical intrusion into the cylinder. The present invention provides for decontamination of both the interior of the cylinder and of the enclosure within which the cylinder is placed for removal of the contents. Within such enclosure, the cylinder is securely restrained and complete drainage of the cylinder is accomplished without repetitive manipulation of the cylinder or the enclosure. The present invention further ensures that the decompressurization process is completely effected.

Generally described, the apparatus of the present invention comprises an enclosure defining a chamber of sufficient dimension to receive a cylinder to be emptied, and means for shearing off a portion of the cylinder whereby the contents of the cylinder are released into the chamber. The method of the present invention comprises the steps of enclosing a cylinder to be emptied within a chamber, and shearing off a portion of the cylinder whereby the contents of the cylinder are released into the chamber. The apparatus of the present invention may further include means for cutting selected portions of the cylinder so as to remove a portion of the cylinder. Similarly, the method of the present invention may further include the step of cutting selected portions of the cylinder so as to remove a portion of the cylinder.

Described somewhat more particularly, a preferred embodiment of the apparatus of the present invention comprises a vessel defining a chamber of sufficient dimension to receive a cylinder to be emptied. A shearing assembly is provided within the chamber. The shearing assembly includes a blade that, upon demand, engages and shears off a portion of the cylinder. In one preferred embodiment of the invention, the shearing blade engages the valve stem of a cylinder to be emptied. In another preferred embodiment of the present invention, the shearing blade engages a portion of the main cylinder body to shear off an end portion of the cylinder to be emptied. In both embodiments, an opening is formed in the cylinder to allow the contents to drain from the cylinder. One aspect of the present invention includes means for pivoting the vessel and enclosed cylinder to a substantially vertical position to enhance drainage of the contents from the cylinder. It will be appreciated that this aspect of the present invention provides for effective and complete drainage of the cylinder's contents without repetitive manipulation of vessel and cylinder.

The present invention further includes means for decontaminating both the drained cylinder and the vessel. In a preferred embodiment, this aspect of the present invention includes a nozzle mounted on an hydraulic cylinder that is capable of traveling one dimension of the chamber. As it travels, the nozzle disperses a decontamination fluid into the drained cylinder and the vessel's chamber, thereby decontaminating both.

The present invention further includes secondary means for opening the cylinder separate and apart from the shearing assembly. In a preferred embodiment of the present invention, this secondary means for opening the cylinder may comprise a saw that is mounted on an hydraulic cylinder within the chamber. The saw may be a band or a hack saw that, upon activation of the cylinder, is capable of sawing through a portion of the cylinder. This aspect of the present invention contemplates that the cylinder is spun about its longitudinal axis so that the saw is introduced to different sections of the cylinder, thereby effecting a cut around the entire circumference of the cylinder. It is to be appreciated that the secondary system may be used in tandem with the shearing assembly. For example, if the shearing assembly should fail in some capacity, the saw can effect an opening in the cylinder and the emptying process can be completed without outside intervention and the resulting potential discharge of hazardous waste.

Described somewhat more particularly, the method of the present invention comprises the steps of providing a sealed chamber of sufficient dimension to receive a cylinder to be emptied, providing a shearing assembly within the chamber including a blade portion dimensioned and positioned to engage the cylinder, and shearing off a portion of the cylinder. It is to be understood that the portion to be sheared may vary. For example, a valve stem or an end portion of a cylinder may be sheared off to open the cylinder. In a preferred embodiment of the method, the cylinder may be placed in a substantially horizontal position to enhance drainage of the contents from the cylinder, thereby avoiding the repetitive manipulation or rocking of the cylinder associated with prior art systems. It should also be understood that removal of the contents may be accomplished by evacuating contents from the cylinder as described in greater detail hereinbelow.

The method of the present invention may further include the step of introducing an inert gas into the chamber so as to reduce the potential for explosion. In addition, the method of the present invention may include the step of sawing off a potion of the cylinder to effect an opening therein through which gas may escape and solids and liquids may be drained.

Thus, it is an object of the present invention to provide an improved method and apparatus for removing the contents from compressed gas and liquefied cylinders for inspection, transportation and disposal.

It is a further object of the present invention to provide a safer method and apparatus for removing the contents from compressed gas and liquefied cylinders for inspection, transportation and disposal.

It is yet another object of the present invention to provide a method to decontaminate the interior of a processing vessel and the target cylinder to allow processing of a wide range of gaseous and liquid material, including those containing radioactive particles.

It is yet another object of the present invention to provide a method and apparatus for removing the contents of compressed gas and liquefied cylinders in such a manner as to reduce the potential for explosion caused by the operation of removing the contents of the cylinder.

It is yet another object of the present invention to provide a method and apparatus for removing the contents of compressed gas and liquefied cylinders that reduces the potential for missile-like propulsion of the cylinders due to the removal of the contents of the cylinder.

It is yet another object of the present invention to provide a method and apparatus for removing the contents of compressed gas cylinders that ensures both the cylinder and the apparatus is decontaminated.

It is yet another object of the present invention to provide a method and apparatus for removing the contents from compressed gas and liquefied cylinders that includes a secondary system that can effect an opening in the target cylinder separate and apart of any shearing or other mechanism.

These and other objects, features and advantages of the present invention will become apparent from a reading of the following specification taken in conjunction with the accompanying drawings.

DETAILED DESCRIPTION OF THE DISCLOSED EMBODIMENTS

Figure 1:
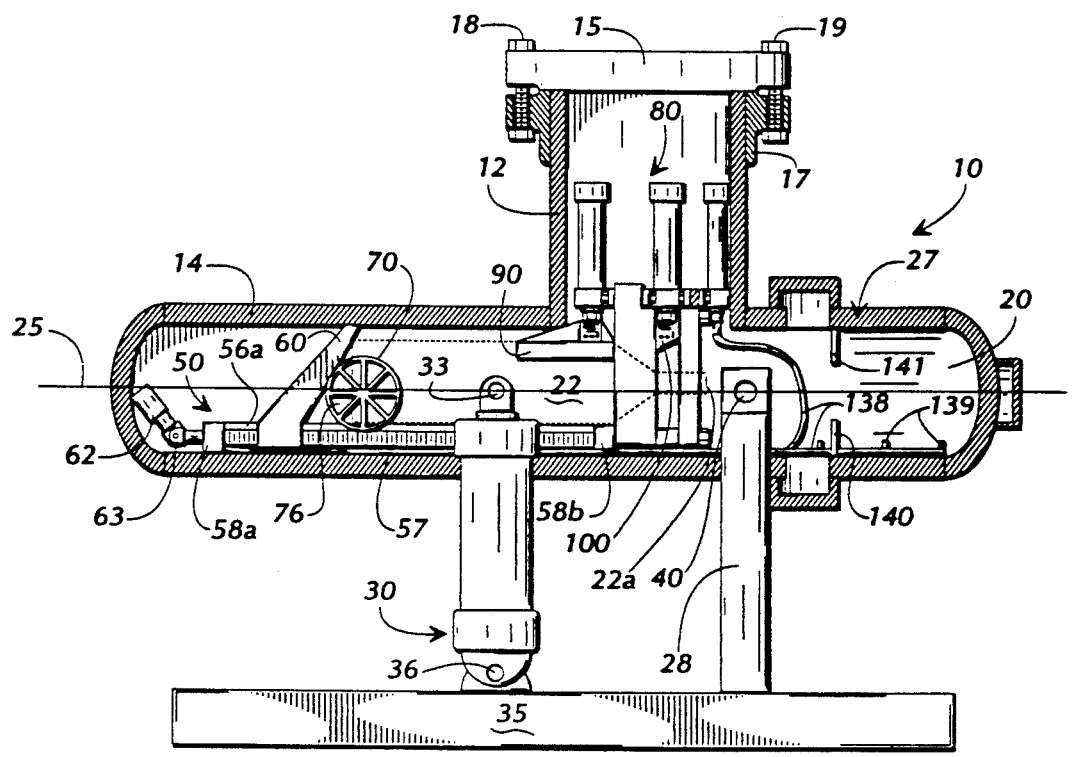
FIG. 1 is a cross-section view of a preferred embodiment of the present invention showing the chamber in a substantially horizontal position.

Referring now to the drawings, in which like numerals refer to like parts throughout the several views, FIG. 1 is a cross-section side view of a preferred embodiment of a cylinder emptying apparatus 10 in accordance with the present invention. The apparatus 10 includes a cylindrically shaped upper housing or tower 12 formed integrally with a cylindrically shaped lower or main housing 14. The tower 12 is sealed by a cap 15. The cap 15 is secured to a mounting bracket 17 fixed to the walls of the tower 12. The cap 15 is secured by bolts 18 and 19. It is to be understood that the cap 15 seals the tower 12 so that no gases or other material can escape the apparatus 10. The cap 15 is removed typically only for maintenance of the internal components of the apparatus 10. The lower and upper housings 12 and 14 are preferably made of steel or a similarly rigid material that is suitable to sustain and maintain the integrity of the apparatus 10 even during the processing of cylinders.

Together, the upper and lower housing portions 12 and 14 define a chamber 20 for processing a target compressed gas cylinder 22. The chamber 20 is of sufficient dimension to receive the cylinder 22. More particularly, the lower housing 14 is of sufficient dimension to receive the cylinder 22 along its longitudinal axis, indicated generally by the line 25. The lower housing 14 includes a hatch 27 at the far end thereof. Those skilled in the art will appreciate that the hatch 27 may be opened for introduction of the cylinder 22 into the chamber 20. This process is typically accomplished by machine, the scope of which is beyond that of the present invention. It is to be appreciated that the hatch 27 is of sufficient strength to withhold the release of material from the cylinder 22 and maintain the sealed chamber 20.

Figure 2:
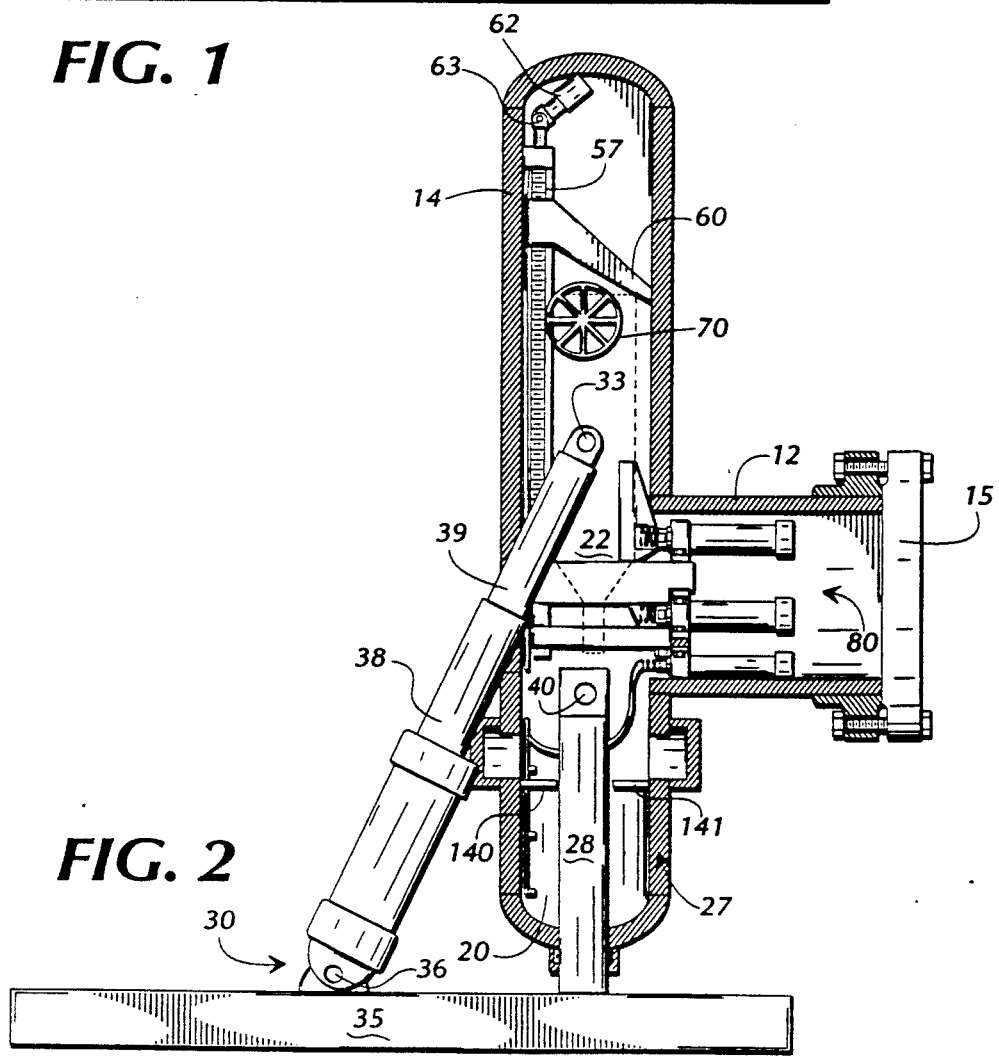
FIG. 2 is a cross-section view of the embodiment of FIG. 1 with the chamber in a substantially vertical position.

The apparatus 10 is pivotally supported in an elevated position by a pair of hinged support legs 28 and a pair of hydraulic actuators 30 The actuators 30 are pivotally secured to the wall of the lower housing at a pin 33. The actuators are likewise pivotally secured to a base member 35 by a pin 36. Each actuator includes telescoping arm members 38 and 39 that can be extended by hydraulic lifters (not shown) on demand. The support legs 28 are fixed in a position substantially perpendicular to the plane of the lower housing 14. The support legs 28 are pivotally secured to the lower housing 14 by a pin 48. It will thus be appreciated that operation of the actuators 30 extends the arms 38 and 39 thereof, thereby displacing the pin 33 and causing the apparatus 10 to pivot about the pin 40. This operation rotates the entire apparatus 10 such that it can assume a substantially vertical position as shown in FIG. 2.

The first disclosed preferred embodiment further includes a cylinder positioning and returning system 50 within the chamber 20. This system 50 is characterized by a pair of support bars 56a and 56b that run effectively from one end of the lower housing 14 to at least the position of the wall of the tower 12. A lead screw 57 is supported by a pair of mounting brackets 58a and 58b. The lead screw 57 runs along the floor of the chamber 20 and is received by bearing surfaces provided integrally with the mounting brackets 58a and 58b. The lead screw operatively supports a cylinder retaining bracket 60. The bracket 60 includes a projecting arm that, as shown in FIG. 1, contacts and returns the cylinder 22 as described below. It is to be understood that rotation of the lead screw 57 causes movement of the retaining bracket 60 such that the bracket may be brought into and removed from contact with the cylinder 22. Such rotation of the lead screw is effected by a motor 62 that turns a universal joint 63 that, in turn, rotates the lead screw 57. Thus, it is to be appreciated that the cylinder 22 is suspended within the chamber by the support bars 56a and 56b and held in place by the retaining bracket 60, in addition to the other means disclosed herein.

Figure 5:
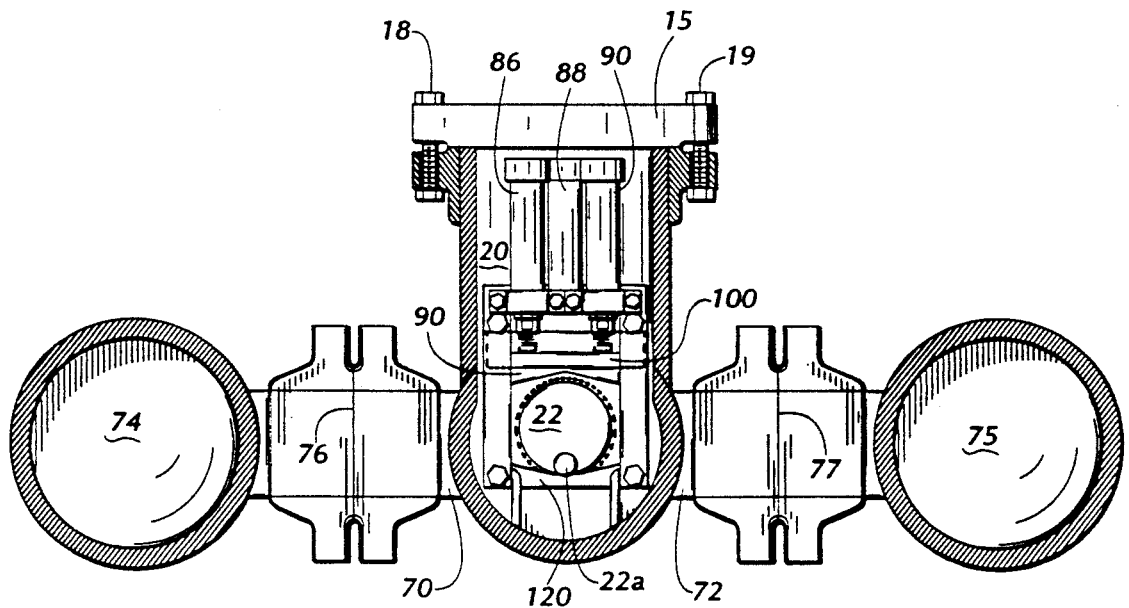
FIG. 5 is a front cross-section view of the apparatus of FIG. 1, including overflow tubes and tanks.
Figure 6:
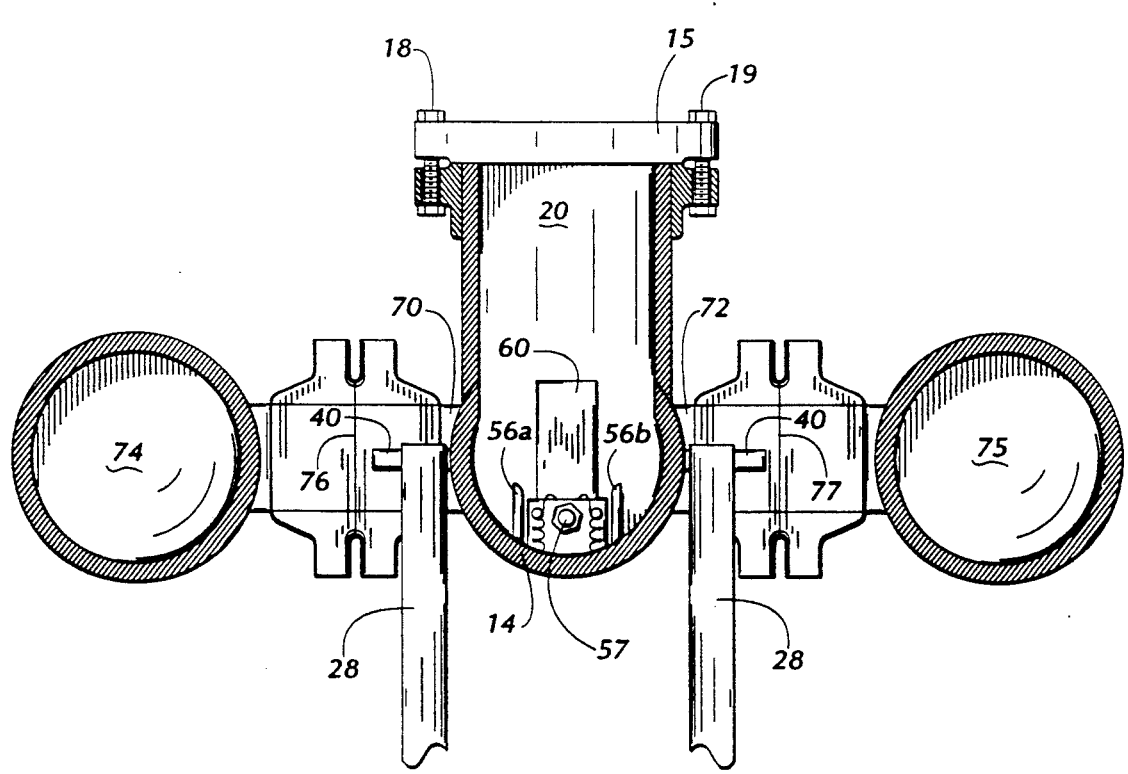
FIG. 6 is a rear cross-section view of the apparatus of FIG. 1, including overflow tubes and tanks, and the cylinder retaining bracket.

FIG. 1 further discloses a port 70. As shown in FIGS. 5 and 6, the port 70 is connected to an overflow tank 74. Similarly, a port 72 is connected to an overflow tank 75. A baffle 76 is provided in port 70. A like baffle 77 is provided in port 72. It is to be understood that the overflow tanks are used or effective only when necessary. The baffles 76 and 77 contain any influx of released gas until the pressure of such gas exceeds the capacity of the baffles. At that time, the highly pressurized gas exploits the baffles 76 and 77 and expands into the tanks 74 and 75. Should this occur, the baffles 76 and 77 may be replaced after appropriate decontamination.

Figure 4:
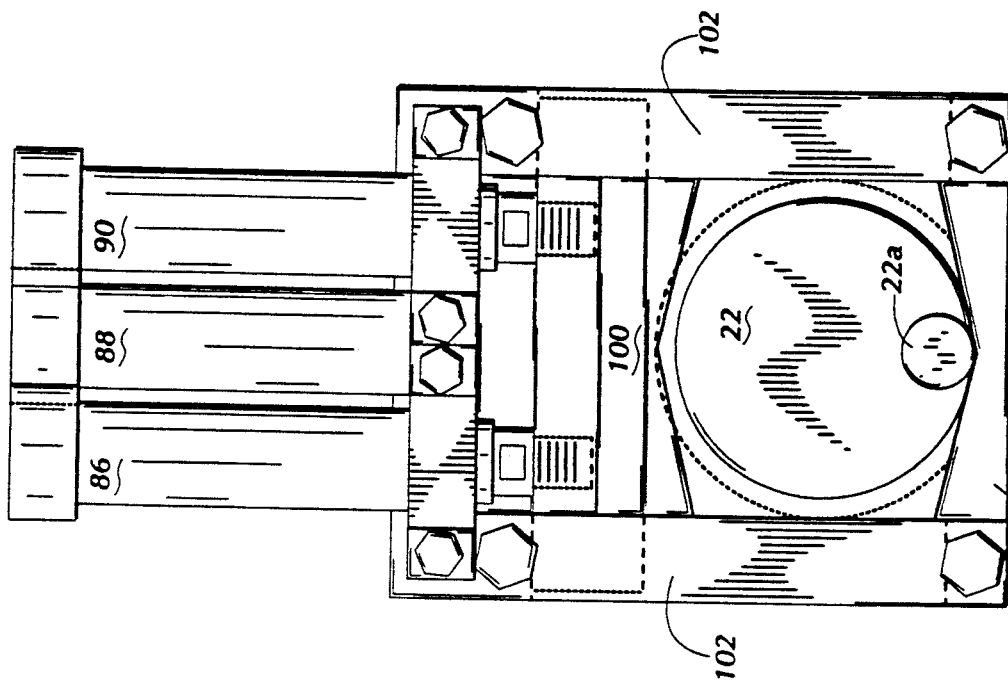
FIG. 4 is an end view of the shearing mechanism shown in the embodiment in FIG. 1.
Figure 3:
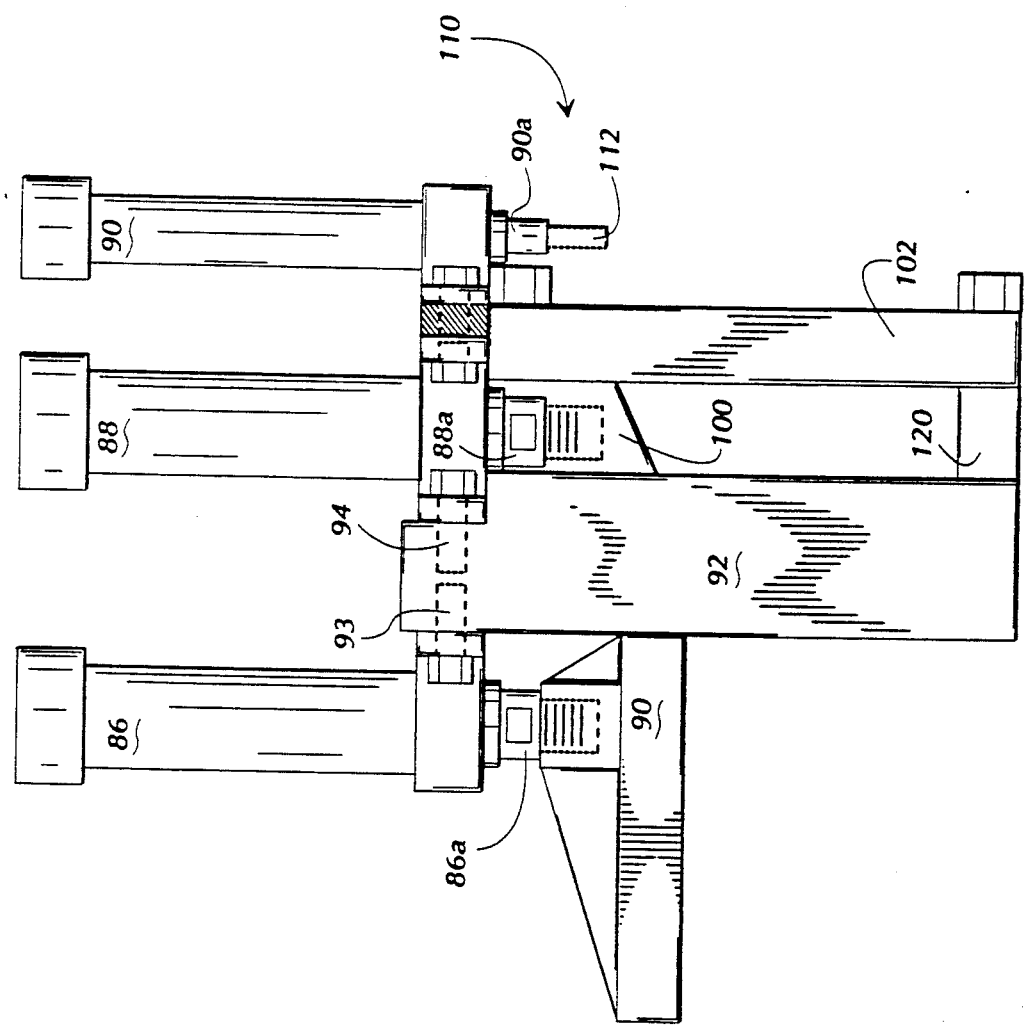
FIG. 3 is a close up view of the shearing mechanism shown in the embodiment in FIG. 1.

A shearing apparatus 80, shown also in FIGS. 3 and 4, is mounted within the chamber 20. The shearing apparatus 80 includes hydraulic cylinders 86, 88, and 90. The hydraulic cylinders 86, 88 and 90 may be mounted upon the floor of the lower housing 14 or the walls of the upper housing 12 as need be. Thus, the cylinders 86, 88 and 90 may be mounted in a conventional manner so long as the functions thereof are met as described below. Each hydraulic cylinder 86, 88 and 90 includes a cylinder piston 86a, 88a and 90a, respectively, disposed for vertical movement therein. A cylinder locking clamp 91 is secured to the end of the piston 86a in a conventional manner. The cylinder locking clamp 91 is thus in position to be lowered into contact with the cylinder 22 to thereby ensure against movement thereof. The hydraulic cylinder 86 is attached to a support leg 92 by a bolt 93. The hydraulic cylinder 88 is similarly attached to the other side of the support leg 92 by a bolt 94. The piston 88a of the hydraulic cylinder 88 carries a shearing blade 100. The shearing blade 100 is preferably made of a material that resists degradation due to significant chemical exposure and is sufficiently rigid to shear cylinders 22 repeatedly. It is to be noted that the hydraulic cylinder 88 is also secured to the support leg 102 to provide stability to the cylinder 88 and the blade 100.

Figure 7A:
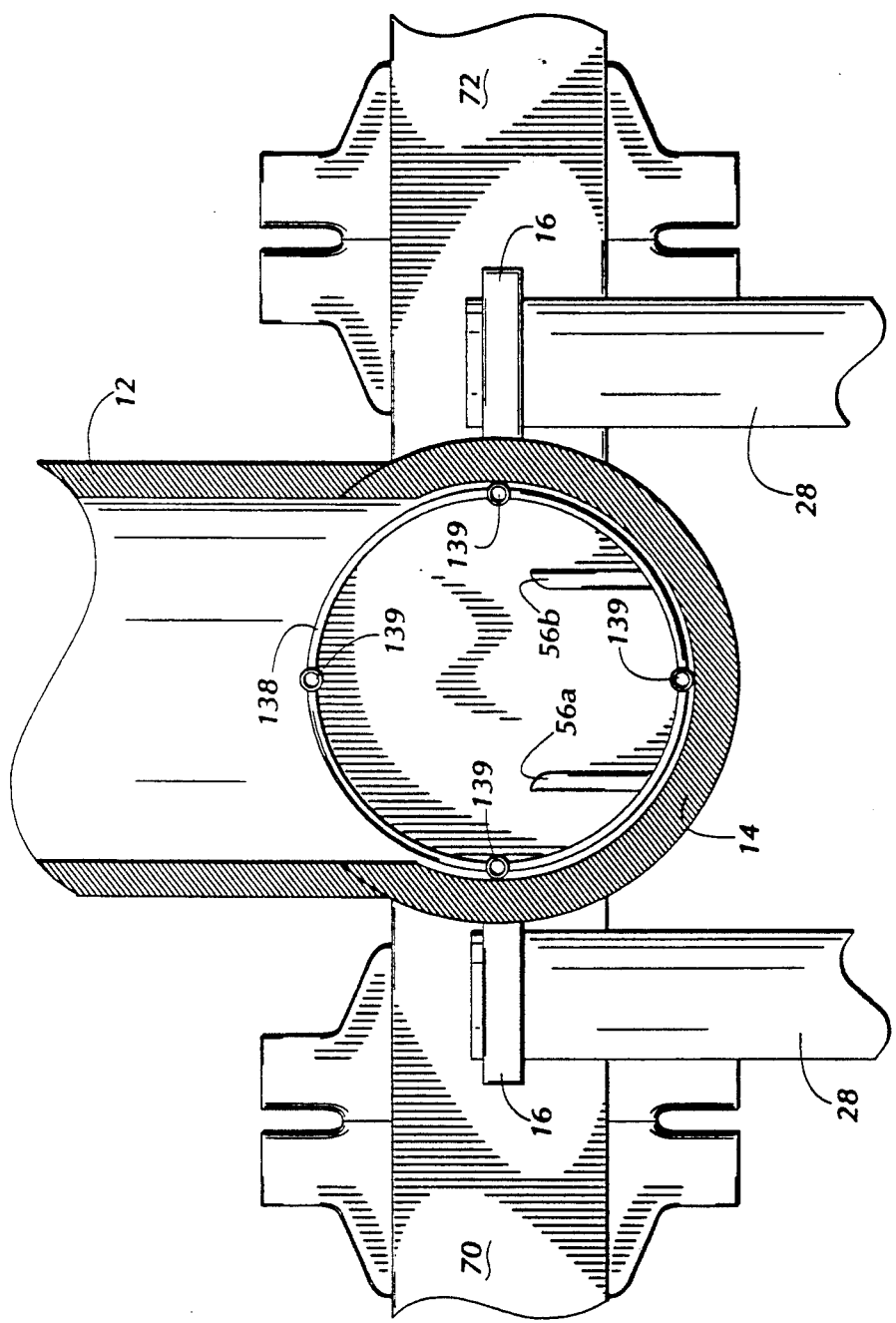
FIG. 7A is a section view showing the decontamination tubing of FIG. 1.

A decontamination assembly 110 is provided at one end of the piston 90a of the hydraulic cylinder 90. The assembly 110 includes a nozzle 112 and a series of hoses 115. The hoses 115 are connected to a remote reservoir (not shown) from which a decontamination medium such as nitrogen, caustic liquid or other suitable compounds is dispensed through the nozzle and hoses by the use of a liquid pump, a compressor or by the use of a pressurized gas. The positioning of the nozzle 112 on the piston 90a permits the nozzle to travel a distance equal to the length of the piston and spray the decontamination fluid about the chamber 20 and the cylinder 22, as perhaps shown best in FIG. 7A.

At the base of the support legs 92 and 102, a base pad 120 is provided. The pad 120 is positioned on the support legs 92 and 102 at the same height as the cylinder support bars 56a and 56b to accept the cylinder 22. As is discussed below, the target cylinder 22 is positioned on the cylinder locking system 24 and is further secured in place by the clamp 91 and the pad 120.

A valve 22a is provided on the target cylinder 22. The cylinder 22 is positioned so that the stem 22a extends through the space between the support members 92 and 102. The shearing blade 100 may be moved downwardly to shear off a portion of the valve stem 22a from the target cylinder 22, thereby releasing the contents from the target cylinder. Further, the cylinder 22 may be positioned such that a portion of the main cylinder body sets immediately below the shearing blade 90. This arrangement provides for a portion of the cylinder 22 itself to be acted upon by the shearing blade 90. For example, the cylinder 22 could be placed in the chamber 20 in such a manner that the valve stem 22a is positioned furtherest away from the hatch 27. Then, one end of the cylinder 22 would be sheared off.

Figure 7B:
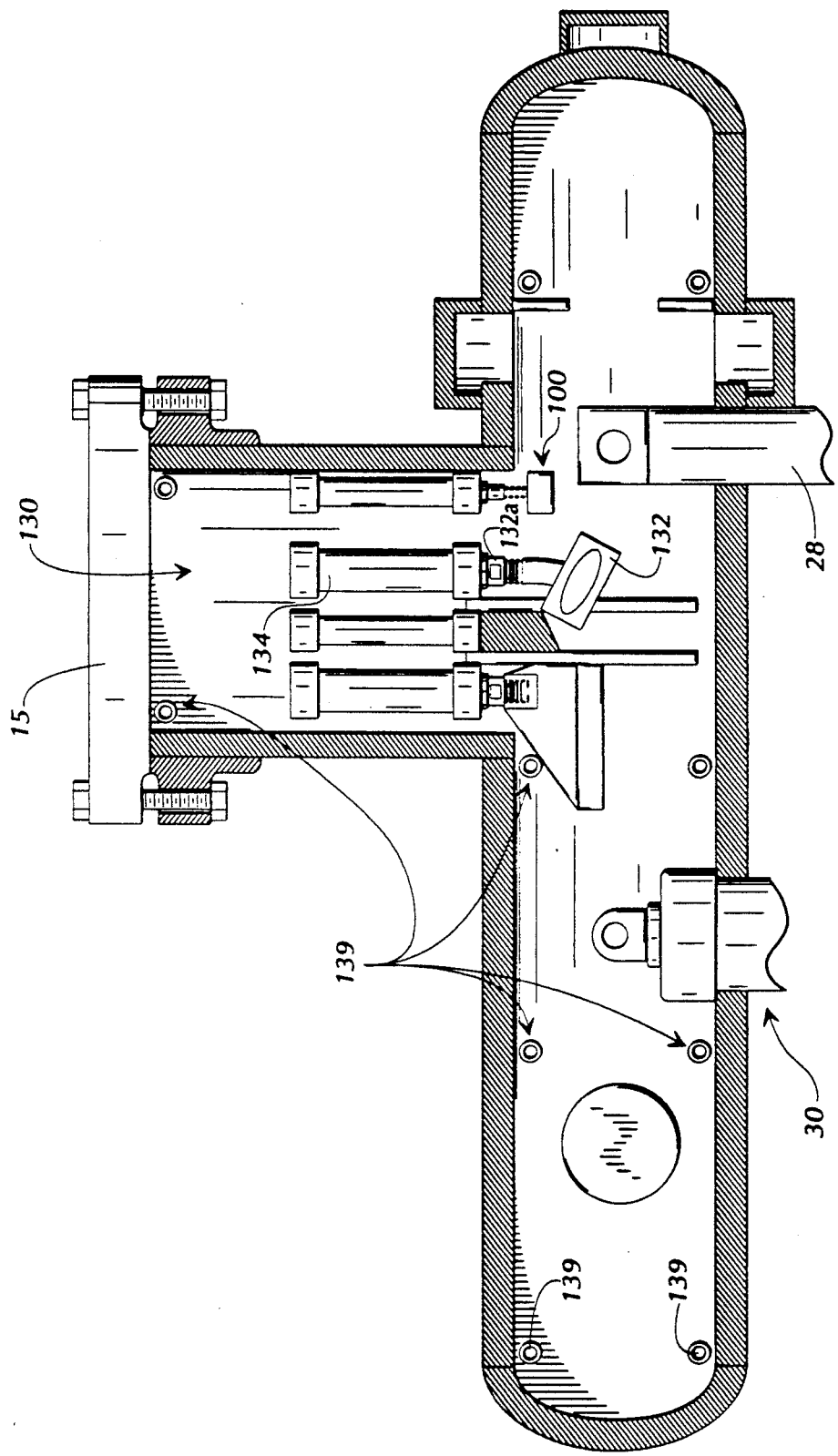
FIG. 7B is a section view showing an alternative embodiment of the present invention including a secondary cutting system.

The present invention further contemplates that a secondary system may be employed. As shown in FIG. 7B, a saw assembly 130 may be provided. The preferred embodiment provides a band saw 132 operatively secured on the base of a piston 132a of an hydraulic cylinder 134. Upon action of the piston 132a, the saw 132 engages a portion of the cylinder 22 and cuts that portion. The cylinder 22 is then mechanically spun about its axis so that the saw 132 is able to act on another portion thereof. This process is repeated until a cut is made about the entire periphery of the cylinder 22, thereby effecting an opening of the cylinder. The spinning of the cylinder 22 can be accomplished by powered friction rollers placed against the cylinder 22. A preferred means for such an operation would be to replace the supports 26 with friction rollers. The mechanics of turning the friction rollers to, in turn, rotate the cylinder 22 are well known.

A network of decontamination tubing 138 extends around the inner surface of the lower housing 14. Decontamination fluids, such as gases and liquids, may be pumped through the tubing 138 through the use of a liquid pump, a compressor or pressurized gas. Nozzles 139 are positioned along the tubing 138 to facilitate distribution of the fluids for decontaminating the interior of the chamber 20 and the interior of the target cylinder 22, once the contents of the cylinder 22 have been released and collected.

Before contents may be released from the target cylinder 22, the cylinder 22 must be secured to prevent missle-like propulsion upon rapid depressurization during shearing or cutting. To secure its position, the target cylinder 22 is loaded into the chamber through a hatch 27. When closed, the hatch 27 provides air tight seal of the chamber 20. A pair of splash baffles 140 and 141 are provided on the interior of the hatch 27 to deflect gases and liquids. The target cylinder 22 is placed on the cylinder support bars 56a and 56b. The hydraulic motor is activated to turn the lead screw 57. This advances the target cylinder 22 until the valve 22a is aligned with the shearing blade 100 and a portion of the target cylinder 22 rests on the pad 120. The hydraulic cylinder 86 is then activated to extend the cylinder piston 86 so that the clamp 90 is pressed against the outer surface of the target cylinder 22 to restrain the target cylinder from movement. The pad 120 and clamp 90 are preferably somewhat V-shaped to cradle the target cylinder 22.

If extremely high pressure is encountered upon shearing or cutting of the target cylinder 22, the overflow tanks 74 and 75 automatically permit gas to escape the chamber 20 by means of the rupture disks 76 and 77, thereby reducing the pressure within the chamber. Otherwise, the contents of the cylinder 22 are released into and contained within the chamber 20.

To accomplish the release of contents from the secured target cylinder 22, air is evacuated from the chamber 20 through an outlet port (not shown) and replaced with a suitable inert gas such as nitrogen through an inlet port (not shown). The hydraulic cylinder 88 is then remotely activated to promote downward movement of the cylinder piston 88a, thereby causing the shearing blade 100 and shear the valve stem 22a off from the target cylinder 22. Gases previously contained within the target cylinder 22 and then released to the chamber 20 exit the higher pressure environment of the chamber and are directed through an outlet port (not shown) to a remote site. Liquids emptied from the target cylinder may also drain from the target cylinder and likewise be collected. Those skilled in the art will appreciate that such an operation may be accomplished by means of a vacuum pump, a compressor, or a liquid pump in operative association with the network of decontamination tubing 138 to facilitate decontamination of released gases pumps and vacuums to withdraw gases from the chamber 20 and recontainerize such gases (including any liquids) in a new cylinder. To facilitate drainage of any liquid and any solid matter, the hydraulic actuators 30 may be activated to place the apparatus 10 in substantially vertical position, as shown in FIG. 2. Once these fluids and gases have been collected, decontamination fluids may be directed through the nozzles 138 and the decontamination assembly 110 by means of a liquid pump or a compressor to wash the interior of the target cylinder and the chamber. The spent decontamination fluids may likewise be evacuated by way of the decontamination tubing 138 by using a liquid pump, a compressor, or a vacuum pump.

While the shearing blade is shown removing the valve stem 22a, it will be understood that the cylinder 22 may be oriented in the chamber such that one end of the cylinder body is aligned with the shearing blade 100 for shearing or cutting by the saw. In this manner, the target cylinder 22 may be sheared or cut at a point other than at the valve stem 22a. This allows a cut to be made in the cylinder 22 which provides a larger area through which fluids may flow. This is particularly helpful in the event of low cylinder pressure or when the cylinder contains solid matter.

The apparatus 10 provides an improved apparatus for emptying compressed gas cylinders. The cylinder retaining assembly 50, in combination with the locking clamp 90 and pad 20, provides secure mounting of the target gas cylinder 22 on both its longitudinal and latitudinal axis to greatly reduce the risk of sudden propulsion of the cylinder 22 upon depressurization. Also, shearing or cutting poses less of a sparking hazard than previous methods, because these are slower processes that does not produce as much heat or friction. Additionally, more complete drainage is assured because of the direct drainage path created by vertical alignment of the apparatus 10 which allows gravity induced drainage without the necessity of additional manipulation of the cylinder in the form of rocking or shaking. Finally, the apparatus 10 provides for decontamination of the interior of the cylinder 22 and of the chamber 11, which greatly reduces the risk of the environment and of workers to exposure to hazardous substances.

Those skilled in the art will appreciate that operation of the preferred embodiments disclosed herein is accomplished by an operator at a remote source. The operator is in contact with the apparatus 10 by means of electronic and video communication. Various video equipment can be used to permit the operator to view the interior and the immediate exterior of the vessel. The vessel 10 and its components are powered conventionally and techniques therefor are known in the art. Moreover, it is to be understood that the apparatus 10 can be mobilized for movement from waste site to waste site, thereby facilitating sampling and recontainerization of cylinders at multiple sites.

Other objects, features, and advantages of the present invention will become apparent upon reading the following detailed description of the preferred embodiment of the invention when taken in conjunction with the drawings and the appended claims.

I claim:

1. An apparatus for emptying the contents of a cylinder, comprising:
    a housing defining a chamber;
    means for selectively sealing said chamber;
    means for supporting a cylinder to be emptied within said chamber; and
    means disposed within said chamber for shearing off a portion of said cylinder, wherein said shearing means comprises a saw disposed within said chamber for selective engagement with said portion of said cylinder to be sheared off such that operative engagement of said saw with said cylinder shears off a portion of said cylinder so as to release the contents therefrom.

2. The apparatus of claim 1 further comprising means for manipulating the position of said chamber such that said chamber and said cylinder are initially aligned in a substantially horizontal position when said cylinder is first introduced into said chamber, and are subsequently aligned in a substantially vertical position to thereby effect gravitational drainage of the contents from said cylinder often a portion of said cylinder is sheared off.

* * * * *